Patented June 1, 1943

2,320,820

UNITED STATES PATENT OFFICE 2,320,820

CONDENSATION PRODUCTS OF AN AMINO-TRIAZOLE, AN ALDEHYDE, AND A HALOGENATED NITRILE

Gaetano F. D'Alelio, Pittsfield, Mass., assignor to General Electric Company, a corporation of New York No Drawing. Application March 19, 1942, Serial No. 435,344

20 Claims. (Cl. 260—42)

This invention relates to new condensation products and to methods of making the same. The invention is concerned more particularly with self-curing aminoplasts, by which are meant heat-convertible resinous condensation products prepared from amino or amido compounds and having the characteristic property of curing under heat or under heat and pressure without the addition of a curing accelerator or catalyst.

This application is a continuation-in-part of my copending applications Serial No. 289,274, filed August 9, 1939, and Serial No. 371,583, filed December 24, 1940, both of which applications are assigned to the same assignee as the present invention.

In application Serial No. 289,274 I disclosed and claimed new and useful compositions of matter comprising a condensation product of ingredients comprising (1) an amidogen compound, more particularly a urea, (2) an aliphatic aldehyde, specifically formaldehyde, and (3) a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles. I also disclosed in that application that the amidogen compound may be an aminotriazole.

In application Serial No. 371,583, which is a continuation-in-part of Serial No. 289,274, I disclosed and claimed compositions comprising a condensation product of ingredients comprising an aminotriazine, an aldehyde and a halogenated nitrile such as mentioned in the preceding paragraph with reference to Serial No. 289,274.

The present invention differs from the inventions claimed in the above-identified copending applications in that it is directed to new and useful condensation products obtained by reaction of ingredients comprising an aminotriazole (amidogentriazole) and an aldehyde in the presence of a halogenated nitrile of the kind mentioned above.

In the production of aminoplasts it has been common practice in converting such materials to the insoluble, infusible state to incorporate into the condensation product or into the molding composition a latent or an active (direct) curing catalyst. As pointed out more particularly hereafter, this technique and the final products have not been wholly satisfactory.

I have discovered that self-curing aminoplasts can be produced by condensing an aminotriazole (that is, an aldehyde-reactable aminotriazole), an aldehyde, including polymeric aldehydes, hydroxyaldehydes and aldehyde-addition products, and a halogenated nitrile of the above-mentioned class. The initial condensation may be carried out at normal or at elevated temperatures, in the presence or absence of a condensation catalyst and under alkaline, neutral or acid conditions.

The halogenated nitriles used in practicing this invention are those nitriles of the halogenated aliphatic series in which at least one halogen atom is attached to an alpha, a beta or a gamma carbon atom or to any two or all of such carbon atoms. An example of such a nitrile is chloroacetonitrile, $ClCH_2CN$.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles that must be scrapped or sold at reduced price is of considerable commercial importance.

The resin syrups and molding compositions of this invention may be stored for long periods of time without material alteration. In marked contrast the prior heat-convertible aminoplasts of the aminotriazole-aldehyde type, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect, the condensation reaction between the aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter, the solution is treated to eliminate acidic conditions due to acid or acid salts. That is, the mass is neutralized or is made alkaline by adding an alkaline substance. The reaction is then caused to proceed further to produce the aminoplasts of the invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and of acid salts.

Various ways may be employed for effecting initial reaction between the components. For example, I may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the halogenated nitrile to a partial condensation product of an aminotriazole and an aldehyde and effect further condensation between the components. In producing such a partial condensation product I prefer to cause the condensation reaction between the aminotriazole and the aldehyde to take place in the presence of a primary condensation catalyst and a secondary condensation catalyst. The primary catalyst advantageously is a member of the class consisting of (1) nitrogen-containing basic tertiary compounds that are aldehyde-non-reactable, e. g., tertiary amines such as trialkyl (for example, trimethyl, triethyl, etc.) amines, triaryl (for example, triphenyl, tritolyl, etc.) amines, etc., and (2) nitrogen-containing basic compounds that are aldehyde-reactable, for instance, ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of primary catalyst, should be a fixed alkali, for instance, a carbonate, cyanide or hydroxide of an alkali metal (e. g., sodium, potassium, lithium, etc.).

Another method of effecting reaction between the ingredients comprises first condensing the halogenated nitrile with the aldehyde, adding the resulting condensation product to an aminotriazole-aldehyde partial condensation product and then causing the reaction to proceed further. Or, I may condense or partially condense the halogenated nitrile with a mol excess of an aldehyde, add an aminotriazole to this condensation product and effect further reaction between the components. Still other ways may be employed in combining the components and in producing the unmodified and modified condensation products of this invention, as readily will be understood by those skilled in the art as the description of the invention proceeds. These condensation reactions may be carried out under a wide variety of time, temperature and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, dyes, lubricants, plasticizers, etc., may be used, for example, as molding compositions. The modified and unmodified resinous masses are self-convertible under heat or under heat and pressure to the insoluble, infusible state.

Depending upon the particular reactants employed and the particular conditions of reaction, these intermediate condensation products vary from clear, colorless, syrupy, water-soluble liquids to viscous, milky dispersions and gel-like masses of decreased solubility in ordinary solvents such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface-coating materials, in the production of paints, varnishes, lacquers, enamels, etc., for general adhesive applications, in producing laminated articles and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration. All parts are by weight.

*Example 1*

| | Parts |
|---|---|
| 1-phenyl guanazole | 17.5 |
| Aqueous formaldehyde (approx. 37.1% HCHO) | 13.8 |
| Aqueous ammonia (approx. 28% NH$_3$) | 0.6 |
| Aqueous solution of sodium hydroxide (0.5 N) | 0.4 |
| Chloroacetonitrile (m o n ochloroacetonitrile) | 0.19 |

The formaldehyde solution was made alkaline by adding thereto the above-stated amounts of aqueous ammonia and sodium hydroxide. The 1-phenyl guanazole was added to the resulting solution and the mixture was stirred for 2 minutes. The chloroacetonitrile was now added and, after stirring the mixture for 2 minutes, it was allowed to stand for 1 minute. The resulting reaction product was mixed with 10.8 parts alpha cellulose in flock form and 0.1 part of a mold lubricant, specifically zinc stearate, to form a molding (moldable) composition. The wet molding compound was dried at room temperature until sufficient moisture had been removed to provide a material that could be molded satisfactorily. A well-cured molded piece having a well-knit and homogeneous structure was produced by molding a sample of the dried and ground molding composition for 5 minutes at 135° C. under a pressure of 6,750 pounds per square inch. The molded article had good water resistance, as shown by the fact that it absorbed only 4.1% by weight of water when immersed in boiling water for 15 minutes followed by immersion in cold water for 5 minutes. The molding compound had excellent flow characteristics during molding, as evidenced by the amount of flash on the molded piece.

*Example 2*

| | Parts |
|---|---|
| 1-phenyl guanazole | 17.5 |
| Aqueous formaldehyde (approx. 37.1% HCHO) | 16.2 |
| Aqueous ammonia (approx. 28% NH$_3$) | 0.6 |
| Aqueous solution of sodium hydroxide (0.5 N) | 0.4 |
| Gamma-chlorobutyronitrile | 0.26 |

The 1-phenyl guanazole was added to the aqueous formaldehyde solution to which previously had been added the stated amounts of aqueous ammonia and sodium hydroxide. The mixture was heated on the steam plate for 1 minute and then allowed to stand without heating for an additional 1 minute. The gamma-chlorobutyronitrile was now added and the resulting reaction product was mixed with 11.6 parts alpha cellulose and 0.1 part of zinc stearate to form a molding compound. The molding composition was dried and molded as described under Example 1. The molded piece was well cured throughout and had a homogeneous and well-knit structure. It had good water resistance, being comparable with that of molded articles made from the ordinary urea-formaldehyde molding compositions. The molding compound had excellent plastic flow during molding.

*Example 3*

| | Parts |
|---|---|
| 1-phenyl guanazole | 17.5 |
| Aqueous formaldehyde (approx. 37.1% HCHO) | 20.2 |
| Aqueous ammonia (approx. 28% NH$_3$) | 0.6 |
| Aqueous solution of sodium hydroxide (0.5 N) | 0.4 |
| Alpha, beta-dichloropropionitrile | 0.2 |

The 1-phenyl guanazole and dichloropropionitrile were added to the aqueous formaldehyde solution to which previously had been added the stated amounts of aqueous ammonia and sodium hydroxide. The reaction mixture was stirred for 1 minute and then was allowed to stand at room temperature for 2 minutes. This was followed by heating the mass for 2 minutes on a steam plate in order to advance the stage of resinification. A molding composition was prepared by mixing the resulting syrupy condensation product with 11.6 parts alpha cellulose and 0.1 part zinc stearate. The molding composition was dried and a molded article was prepared in accordance with the procedure described under Example 1. The molded piece was well cured throughout and had other properties much the same as the molded article of Example 2.

*Example 4*

| | Parts |
|---|---|
| 1-phenyl guanazole | 17.5 |
| Aqueous formaldehyde (approx. 37.1% HCHO) | 24.3 |
| Aqueous ammonia (approx. 28% NH$_3$) | 0.6 |
| Aqueous solution of sodium hydroxide (0.5 N) | 0.4 |
| Alpha, beta-dibromopropionitrile | 0.27 |

All of the above ingredients were mixed together, the 1-phenyl guanazole and dibromopropionitrile being added last. The reaction mixture was stirred for 2 minutes and then was heated on a steam plate for less than 1 minute. A molding compound and molded article were prepared as described under Example 3. The molded article was well cured throughout and had a water resistance which was approximately the same as that of the molded articles of Examples 2 and 3. The molding compound of this example showed less plasticity during molding than the molding compounds of the previous examples.

*Example 5*

| | Parts |
|---|---|
| 1-phenyl guanazole | 17.5 |
| Urea | 6.0 |
| Aqueous formaldehyde (approx. 37.1% HCHO) | 27.2 |
| Aqueous ammonia (approx. 28% NH$_3$) | 1.3 |
| Aqueous solution of sodium hydroxide (0.5 N) | 0.7 |
| Chloroacetonitrile | 0.3 |

All of the above ingredients with the exception of the 1-phenyl guanazole and the chloroacetonitrile were heated together under reflux at the boiling temperature of the mass for 10 minutes. The resulting urea-formaldehyde partial condensation product was cooled under tap water. The phenyl guanazole was now added and the resulting mixture was stirred at room temperature for 3 minutes, after which it was heated on a steam plate for 1 minute. Small samples of the resinous syrup were tested for their curing characteristics by adding to the individual sample a small amount of chloroacetonitrile, gamma-chlorobutyronitrile, alpha, beta-dichloropropionitrile and alpha, beta-dibromoproprionitrile, followed by heating on a 140° C. hotplate. In each case the samples, to which the halogenated nitrile had been added, cured rapidly to an insoluble and infusible state.

The above-stated amount of chloroacetonitrile was now added to the main batch of resinous syrup and the resulting mass immediately was mixed with 18.6 parts alpha cellulose and 0.1 part zinc stearate to form a molding compound. The wet molding composition was dried at room temperature as described under Example 1. A sample of the dried and ground molding compound was molded for 5 minutes at 135° C. under a pressure of 6,750 pounds per square inch. The molded piece was well cured and had a well-knit and homogeneous structure. It had very good resistance to water as shown by the fact that it absorbed only 1.83% by weight of water when tested for its water-resistance characteristics as described under Example 1. The molding compound showed good plastic flow during molding.

*Example 6*

| | Parts |
|---|---|
| 1-phenyl guanazole | 17.5 |
| Melamine | 12.6 |
| Aqueous formaldehyde (approx. 37.1% HCHO) | 40.5 |
| Aqueous ammonia (approx. 28% NH$_3$) | 1.2 |
| Aqueous solution of sodium hydroxide (0.5 N) | 0.9 |
| Gamma-chlorobutyronitrile | 0.41 |

All of the above ingredients with the exception of the phenyl guanazole and the chlorobutyronitrile were heated together under reflux at boiling temperature for 5 minutes. The phenyl guanazole was not added and the reaction mixture was allowed to stand at room temperature for 2 minutes, resulting in a partial intercondensation of the guanazole derivative with the melamine-formaldehyde partial condensation product. Samples of the resulting resinous syrup were tested for their curing characteristics with various halogenated nitriles as described under the previous example. In all cases the addition of the halogenated nitrile effected a rapid conversion of the resinous syrup to an insoluble and infusible state.

The above-stated amount of gamma-chlorobutyronitrile was added to the main batch of resinous syrup, which thereafter was mixed with 24.4 parts alpha cellulose and 0.1 part zinc stearate to form a molding compound. The molding composition was dried and molded as described under Example 1. The molded piece was removed hot from the mold and did not warp or become distorted upon cooling to room temperature. It had unusually high water resistance, having a water-absorption value of only 0.47% when tested for its water-resistance characteristics as described under Example 1. The molded piece was well cured throughout and had a well-knit and homogeneous structure. The molding compound showed very good plastic flow during molding.

*Example 7*

A

| | Parts |
|---|---|
| 1-phenyl guanazole | 17.5 |
| Aqueous formaldehyde (approx. 37.1% HCHO) | 16.2 |
| Aqueous ammonia (approx. 28% NH₃) | 0.7 |
| Aqueous solution of sodium hydroxide (0.5 N) | 0.4 | were mixed and stirred well for 2 minutes at room temperature, after which the mixture was heated on a steam plate for an additional 2 minutes.

B

| | Parts |
|---|---|
| Dimethylol urea (commercial grade containing approx. 11% by weight of water) | 12.0 |
| Aqueous ammonia (approx. 28% NH₃) | 0.6 |
| Aqueous solution of sodium hydroxide (0.5 N) | 0.3 |
| Water | 8.4 | were heated together under reflux at the boiling temperature of the mass for 10 minutes.

The products of A and B were mixed together while still hot, resulting in a partial intercondensation between the reactants. Samples of the resinous syrup produced in this manner were tested for their curing characteristics with chloroacetonitrile and the other halogenated nitriles mentioned under Example 5 in the same manner as described under that example. In all cases the halogenated nitrile effected a rapid conversion of the resin to an insoluble and infusible state.

The main batch of resinous syrup prepared as described above was now mixed with 0.4 part alpha, beta-dibromopropionitrile and stirred for 1 minute. The partially resinified syrup was mixed with 18.8 parts alpha cellulose and 0.1 part zinc stearate. The resulting molding compound was dried and molded as described under Example 1. The molded piece was well cured throughout and absorbed only 0.86% by weight of water when tested for its water-resistance characteristics as described under Example 1. The molding composition showed excellent plastic flow during molding.

*Example 8*

| | Parts |
|---|---|
| 1-carbamyl guanazole | 14.2 |
| Trimethylol melamine | 21.6 |
| Aqueous formaldehyde (approx. 37.1% HCHO) | 24.3 |
| Aqueous ammonia (approx. 28% NH₃) | 1.2 |
| Aqueous solution of sodium hydroxide (0.5 N) | 1.0 |
| Water | 15.2 |
| Alpha, beta-dichloropropionitrile | 0.38 |

All of the above ingredients with the exception of the guanazole derivative and the dichloropropionitrile were heated together under reflux at the boiling temperature of the mass for 10 minutes. The 1-carbamyl guanazole was now added and the mixture was heated under reflux for an additional 3 minutes. The resulting resinous syrup was tested for its curing characteristics with various halogenated nitriles as described under Example 5. The halogenated nitrile, in all cases, caused the individual resin sample to cure rapidly to an insoluble and infusible state.

The above-stated amount of dichloropropionitrile was added to the main batch of resinous syrup and the resulting mixture then was heated for 1 minute. A molding compound was prepared from this syrup by adding thereto 25.9 parts alpha cellulose and 0.1 part zinc stearate. The molding composition was dried and molded as described under Example 1. The molded piece was well cured and had unusually high water resistance, having a water-absorption value of only 0.39% when tested for its water-resistance characteristics as described under Example 1. The molding composition showed good flow characteristics during molding.

*Example 9*

| | Parts |
|---|---|
| 1-carbamyl guanazole | 14.2 |
| Thiourea | 7.6 |
| Aqueous formaldehyde (approx. 37.1% HCHO) | 40.5 |
| Aqueous ammonia (approx. 28% NH₃) | 1.8 |
| Aqueous solution of sodium hydroxide (0.5 N) | 0.8 |
| Chloroacetonitrile | 0.35 |

All of the above ingredients with the exception of the guanazole derivative and the chloroacetonitrile were heated together under reflux at boiling temperature for 5 minutes. The 1-carbamyl guanazole was now added and refluxing was continued for an additional 5 minutes. Samples of the resulting resinous syrup were tested for their curing characteristics with various halogenated nitriles as described under Example 5, yielding in all cases a well-cured product when the individual sample containing the halogenated nitrile was heated on a 140° C. hotplate.

The above-stated amount of chloroacetonitrile was added to the main batch of resinous syrup, which thereafter was mixed with 21.8 parts alpha cellulose and 0.1 part zinc stearate. The molding compound was dried and molded as described under Example 1. The molded article had a water-absorption value of 1.48%, following the test method described under Example 1. The molded piece was well cured throughout and had a well-knit and homogeneous structure. The molding composition showed good flow characteristics during molding.

Example 10

| | Parts |
|---|---|
| 1-para-tolyl guanazole | 28.6 |
| Aqueous formaldehyde (approx. 37.1% HCHO) | 36.2 |
| Aqueous solution of sodium hydroxide (0.46 N) | 0.3 | were caused to react until the reaction mass separated into two layers. The addition of alpha, beta-dibromopropionitrile to the partially resinified syrup, followed by heating on a 140° C. hotplate, caused the syrup to cure rapidly to an insoluble and infusible state.

Example 11

| | Parts |
|---|---|
| 1-beta-naphthyl guanazole | 43 |
| Aqueous formaldehyde (approx. 37.1% HCHO) | 45 |
| Aqueous solution of sodium hydroxide (0.46 N) | 2 | were mixed and heated in an open reaction vessel for several minutes, at the end of which period of time two layers formed since the resinified mass was water-insoluble. The addition of alpha, beta-dibromopropionitrile to a sample of the resinous material, followed by heating on a 140° C. hotplate, caused the resin to cure rapidly to an infusible and insoluble state. The resinous composition of this example may be used in the preparation of molding compounds.

Example 12

| | Parts |
|---|---|
| Tolyl guanazole | 7.1 |
| Acrolein | 12.6 |
| Aqueous solution of sodium hydroxide (0.46 N) | 0.2 |

Separate tests were made using ortho-tolyl guanazole, meta-tolyl guanazole and para-tolyl guanazole in the amount stated in the above formula for "tolyl guanazole." The ingredients where heated together under reflux at the boiling temperature of the mass for 5 minutes. The addition of a small amount of alpha, beta-dibromopropionitrile to samples of the resinous condensation product, followed by heating on a 140° C. hotplate, caused the individual sample of resin to cure rapidly to an insoluble and infusible state. The properties of the resinous materials obtained with the various tolyl guanazoles were much the same. The resinous compositions of this example may be used in the preparation of molding compounds.

Example 13

| | Parts |
|---|---|
| Naphthyl guanazole | 8.5 |
| Acrolein | 12.6 |
| Aqueous solution of sodium hydroxide (0.46 N) | 0.8 |

Two separate tests were made, one with alpha-naphthyl guanazole and the other with beta-naphthyl guanazole. The ingredients were mixed and heated under reflux at the boiling temperature of the mass for 5 minutes. In both cases well-cured resins were obtained by adding a small amount of alpha, beta-dibromopropionitrile to the naphthyl guanazoleacrolein resinous condensation product, followed by heating on a 140° C. hotplate.

Example 14

| | Parts |
|---|---|
| 1-phenyl guanazole | 58 |
| Furfural | 144 |
| Aqueous ammonia (approx. 28% NH₃) | 2 |
| Aqueous solution of sodium hydroxide (0.5 N) | 2 | were heated together under reflux at the boiling temperature of the mass for 20 minutes. Portions of the resinous condensation product produced in this manner were treated with small amounts of chloroacetonitrile, gamma-chlorobutyronitrile, alpha, beta-dichloropropionitrile and alpha, beta-dibromopropionitrile, followed by refluxing for an additional 10 minutes to cause the halogenated nitrile to intercondense with the partial condensation product of the 1-phenyl guanazole and furfural. When samples of the resulting resinous condensation product were heated on a 140° C. hotplate, the resin cured to an infusible mass. The curing rate was somewhat slower than with resins similarly made by reaction of formaldehyde with 1-phenyl guanazole. The resinous compositions of this example may be used as plasticizers and flow extenders for rapidly curing synthetic resins and less plastic resins to improve their flow and plasticity characteristics.

Example 15

| | Parts |
|---|---|
| 1-phenyl guanazole | 58.0 |
| Acetamide | 20.0 |
| Aqueous formaldehyde (approx. 37.1% HCHO) | 270.0 |
| Aqueous ammonia (approx. 28% NH₃) | 4.0 |
| Aqueous solution of sodium hydroxide (0.5 N) | 3.5 | were heated together under reflux at the boiling temperature of the mass for 15 minutes, yielding a clear, resinous partial condensation product. The addition of halogenated nitriles such as mentioned in the previous example to samples of the resinous syrup, followed by heating on a 140° C. hotplate, caused the resin to cure to an insoluble and infusible state. The resinous compositions of this example may be used in the preparation of molding compositions, particularly in compositions where a pronounced plasticizing effect is desired.

Example 16

| | Parts |
|---|---|
| 1-phenyl guanazole | 58.0 |
| Butyl alcohol | 244.0 |
| Aqueous formaldehyde (approx. 37.1% HCHO) | 135.0 |
| Aqueous ammonia (approx. 28% NH₃) | 2.0 |
| Aqueous solution of sodium hydroxide 0.5 N) | 1.5 | were heated together under reflux at the boiling temperature of the mass for 10 minutes. The resulting condensation product was dehydrated by heating it on a steam plate. The dehydrated syrup was found to be soluble in alcohol, benzene, dioxane, butyl alcohol, allyl alcohol, ethyl acetate, Solvatone and Cellosolve. The solubility and film-forming characteristics of the resinous material make it particularly suitable for use in the preparation of coating and impregnating compositions. Samples of the resin, to which had been added chloroacetonitrile and other halogenated nitriles such as mentioned in the previous examples, were applied to glass plates and the coated plates were baked in an oven at 70° C. for several hours. In each case the baked films were hard, transparent, smooth and water-resistant, and adhered tightly to the glass surface. When the halogenated nitrile was omitted from the applied coating, the baked films were noticeably softer.

*Example 17*

| | Parts |
|---|---|
| 1-phenyl guanazole | 58.0 |
| Diethyl malonate | 53.0 |
| Aqueous formaldehyde (approx. 37.1% HCHO) | 270.0 |
| Aqueous ammonia (approx. 28% NH₃) | 4.0 |
| Aqueous solution of sodium hydroxide (0.5 N) | 2.5 | were heated together under reflux at the boiling temperature of the mass for 30 minutes, at the end of which period of time two layers had formed. The taffy-like, lower resinous layer was separated from the reaction mass. Various halogenated nitriles such as mentioned in the previous examples were added to small samples of the resinous material, followed by heating on a 140° C. hotplate. In all cases the resin passed through a rubbery or almost thermoplastic stage and then cured to an infusible mass. The addition of the halogenated nitrile accelerated the curing of the resin. The resinous compositions of this example may be used advantageously as a modifier of other synthetic resins, particularly synthetic resins of the aminoplast type, to improve their plasticity or flow characteristics.

*Example 18*

| | Parts |
|---|---|
| 1-phenyl guanazole | 58.0 |
| Glycerine | 31.0 |
| Aqueous formaldehyde (approx. 37.1% HCHO) | 135.0 |
| Aqueous ammonia (approx. 28% NH₃) | 2.0 |
| Aqueous solution of sodium hydroxide (0.5 N) | 1.5 | were heated together under reflux at boiling temperature for 15 minutes. The partially resinified syrup was dehydrated by heating it on a hotplate. The solubility characteristics of the dehydrated syrup were much the same as the corresponding product of Example 16. Film-forming compositions were prepared by adding various halogenated nitriles such as mentioned under Example 16 to the dehydrated resin. The resulting compositions then were applied to glass plates and the coated plates were baked at 70° C. for several hours. The properties of the baked films were much the same as the baked films of Example 16. When the halogenated nitrile was omitted from the resinous material, the baked films were not nearly so hard as films obtained from compositions containing the halogenated nitriles.

*Example 19*

| | Parts |
|---|---|
| 1-phenyl guanazole | 58.0 |
| Polyvinyl alcohol | 15.0 |
| Aqueous formaldehyde (approx. 37.1% HCHO) | 270.0 |
| Aqueous ammonia (approx. 28% NH₃) | 3.0 |
| Aqueous solution of sodium hydroxide (0.5 N) | 3.0 | were heated together under reflux at boiling temperature for 5 minutes. Samples of the resulting partial condensation product were treated with small portions of chloroacetonitrile and other halogenated nitriles such as mentioned in the preceding examples, followed by heating on a 140° C. hotplate. In all cases the resin cured to an insoluble and infusible state. Samples of the resin containing the halogenated nitrile were applied to glass plates and the coated plates were baked at 70° C. for several hours. The baked films were hard, opaque and water-resistant, and adhered tightly to the glass surface. The resinous material of this example may be used either in the production of molding compounds or in the preparation of various liquid coating and impregnating compositions.

The following examples illustrate the nature of the resin and of molding compositions made therefrom that are obtained when a halogenated nitrile of the kind with which this invention is concerned is not incorporated into the aminotriazole-aldehyde condensation product.

*Example 20*

| | Parts |
|---|---|
| 1-meta-tolyl guanazole | 14.3 |
| Aqueous formaldehyde (approx. 37.1% HCHO) | 18.1 |
| Aqueous solution of sodium hydroxide (0.46 N) | 0.8 | were heated together in an open reaction vessel for 1 minute, at the end of which period of time a resinous layer began to form. The partially resinified material was mixed with 10.5 parts alpha cellulose and 0.02 part zinc stearate to form a molding composition. The wet molding compound was dried at room temperature as described under Example 1. A sample of the dried and ground molding compound was molded into the form of a disk, using a molding time of 5 minutes, a molding pressure of 3500 pounds per square inch and a molding temperature of 135° C. The molded piece was not completely cured to an insoluble and infusible state, as shown by its visual appearance and the fact that it had very poor water resistance when tested as described under Example 1.

*Example 21*

| | Parts |
|---|---|
| 1-phenyl guanazole | 13.1 |
| Aqueous formaldehyde (approx. 37.1% HCHO) | 18.1 |
| Aqueous solution of sodium hydroxide (0.46 N) | 0.8 | were heated together for 1 minute, resulting in the formation of two distinct layers. The resinous layer was mixed with 10.3 parts alpha cellulose and 0.02 part zinc stearate to form a molding composition. The wet compound was dried at 60° C. until sufficient moisture had been removed to provide a material that could be molded satisfactorily. A sample of the dried and ground molding composition was molded at a temperature of 135° C. for 3 minutes under a pressure of 4500 pounds per square inch. The molded piece absorbed 24% by weight of water when tested as described under Example 1. This shows that the molded article was not completely cured to an insoluble and infusible state.

It will be understood, of course, by those skilled in the art that the reaction between the reactants may be effected at temperatures ranging, for example, from room temperature to the fusion or boiling temperature of the mixed reactants, the reaction proceeding more slowly at normal temperature than at elevated temperatures in accordance with the general law of chemical reactions.

It also will be understood that the halogenated nitriles mentioned in the above examples are only by way of illustration and that various other halogenated nitriles may be used in carrying this invention into effect. Thus, instead of the halogenated nitriles given in the foregoing examples, I may use any other alpha halogenated nitrile, beta halogenated nitrile, gamma halogenated nitrile, alpha beta halogenated nitrile, alpha gamma halogenated nitrile, beta gamma halogenated nitrile or alpha beta gamma halogenated nitrile, the said nitriles being members of the halogenated aliphatic series, numerous examples of which are given below:

Dichloroacetonitrile
Trichloroacetonitrile
Tribromoacetonitrile
Iodoacetonitrile
Bromoacetonitrile
Alpha chloropropionitrile
Beta chloropropionitrile
Alpha, alpha dichloropropionitrile
Alpha dichloro, beta chloropropionitrile
Alpha iodobutyronitrile
Beta bromobutyronitrile
Alpha, gamma dichlorobutyronitrile
Beta, gamma diiodobutyronitrile
Alpha bromo, beta chlorobutyronitrile
Alpha, beta, gamma trichlorobutyronitrile
Alpha chloro, gamma bromobutyronitrile
Alpha chloromalononitrile
Alpha chlorocyanoacetamide
Alpha bromosuccinonitrile
Tetrabromofuronitrile
Alpha chloro, gamma cyanoacetone
Beta chloro, beta nitro butyronitrile
Alpha dichloro phenyl acetonitrile
Chloral cyanohydrin
Alpha chloro ethylene cyanohydrin
Alpha chloro, alpha beta di-(para-toluyl) propionitrile Formulas for the above examples of halogenated nitriles are given in my copending application Serial No. 289,274.

It also will be understood that in each of the specific halogenated nitriles above named the particular halogen mentioned may be replaced by some other halogen, care being taken in the choice of the halogen in the light of the properties desired in the final product. For example, when light-colored molded articles are desired, the use of iodo derivatives should be avoided and when the heat-convertible resins are to be used in the production of molding compositions, the fluoro derivatives preferably are avoided.

Where a plurality of halogen atoms are present in the nitrile molecule, these may be the same or different. For example, one halogen in the molecule may be chlorine and another, bromine. In this way it is possible to obtain a heat-convertible resin of self-curing characteristics and other properties best adapted to meet a particular molding problem and service application of the finished article.

Likewise, it also will be understood that the aminotriazoles named in the above examples are by way of illustration and that any other aldehyde-reactable aminotriazoles may be employed. I prefer to use triazoles containing either at least one unsubstituted amidogen (—NH₂) group or a plurality of partly substituted amidogen groups.

Examples of such triazoles which may be used in producing the new synthetic materials of this invention are guanazole, 3-hydrazino 1,2,4-triazole, 3-amino 1,2,4-triazole, 1-phenyl 5-amino 1,2,3-triazole, 5-amino 3-oxy 1,2,4-triazole, 1-amino 1,2,3,-triazole; derivatives of guanazole, e. g., 3,5-dihydrazino 1,2,4-triazole, guanazoguanazole, imidurazo-guanazole, 4-phenyl 3,5-dianilino 1,2,4-triazole, etc.; nuclearly substituted amino-triazoles, e. g., 4-p-tolyl 3,5-di-p-toluidino 1,2,4-triazole, 1,4-diphenyl 3,5-dianilino 1,2,4-triazole, 2-methyl 1-phenyl guanazole, 1-phenyl 3-amino 5-methyl 1,2,4-triazole, 2-phenyl 5-amino 4-methyl 1,2,3-triazole, 1-phenyl guanazole, the 1-tolyl guanazoles, the 1-naphthyl guanazoles, 1-phenyl 3-amino 1,2,4-triazole, 3,4-diamino 1,2,4-triazole, 2-phenyl 4,5-diamino 1,2,3-triazole; poly-amino triazoles wherein the hydrogen atoms of one or all of the amino groups are partially substituted by other amino groups, e. g., 3,5-dihydrazino 4-amino 1,2,4-triazole, 3-hydrazino 5-amino 1,2,4-triazole, 4-hydrazino 5-amino 1,2,3-triazole, etc.; poly-amino triazoles wherein the hydrogen atoms of one or all of the amino groups are partially substituted by other monovalent substituents (e. g., alkyl, aryl, aralkyl, alkaryl, etc.), for instance 1-phenyl 5-amino 3-anilino 1,2,4-triazole; 1-phenyl 5-amino 3-p-toluidino 1,2,4,-triazole, 4-β-naphthyl 3,5-di-(β-naphthylamino) 1,2,4-triazole, 2-phenyl 4-amino 5-acetamino 1,2,3-triazole.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, benzaldehyde, hydroxyaldehydes (e. g., glycollic aldehyde, glyceraldehyde), furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-methylol derivatives of urea, thiourea, selenourea and iminourea, and of substituted ureas, thioureas, selenoureas and iminoureas (numerous examples of which are given in my copending application Serial No. 377,524, filed February 5, 1941, and assigned to the same assignee as the present invention), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in my copending application Serial No. 377,524. Particularly good results are obtained with active methylene-containing bodies such as mono- and di-methylol ureas and the methylol melamines, e. g., mono-, di-, tri-, tetra-, penta- and hexa-methylol melamines. Mono- or poly-(N-carbinol) derivatives, specifically the mono- or poly-methylol derivatives of an aminotriazole as, for instance, a methylol guanazole may be caused to react with the halogenated nitriles used in carrying the present invention into effect, in which case it is not necessary to use an aminotriazole and an aldehyde as individual starting reactants. Mixtures of aldehydes and aldehyde-addition products may be employed, for example mixtures of formaldehyde and methylol compounds such, for instance, as dimethylol urea, dimethylol guanazole, trimethylol melamine, etc.

A part of the aminotriazole reactant may be replaced if desired by, for example, a urea, e. g., urea ($NH_2CONH_2$), thiourea, selenourea, iminourea and aldehyde-reactable substitution products thereof, e. g., methyl urea, phenyl thiourea, etc., by aldehyde-addition products of a urea, e. g., dimethylol urea, etc., or by other organic compounds capable of reacting with an aldehyde, especially compounds that react with aldehyde to form resins. Numerous examples of compounds embraced by the term "a urea" are given in my copending application Serial No. 289,274. I may use either a single or a plurality of halogenated nitriles with the aminotriazole reactant or with the aminotriazole and urea reactants. Various aminodiazines, aminodiazoles or aminotriazines may be used in place of a part of the aminotriazole.

The ratio of the aldehydic reactant to the aminotriazole may be considerably varied, but, in general, it is desirable to use at least one mol of an aldehyde for each mol of aminotriazole. In producing the heat-convertible resinous condensation products of this invention, the proportion of the halogenated nitrile in all cases is at least sufficient to render the resin convertible under heat to an insoluble, infusible state. Ordinarily not exceeding substantially ⅛ mol of halogenated nitrile is used for each mol of aminotriazole. No advantage ordinarily accrues from using an amount of halogenated nitrile above the minimum required to secure the desired curing rate. Further, the use of higher amounts of halogenated nitrile is undesirable for most molding applications because of the greater difficulty in obtaining molded articles of suitable hardness, but may not be objectionable for other applications of the material. Also, in some cases, particularly where high molecular weight halogenated nitriles, as for example alpha chlorostearyl nitrile, are used, the halogenated nitrile portion of the resin molecule exceeds on a weight basis the aminotriazole portion of the molecule. Consequently, in such cases the inherent characteristics (for example, waxy nature) of the halogenated nitrile predominate in the resin molecule. This may be objectionable in some applications of the molded part, for instance where resistance to the ordinary organic solvents is required.

From the foregoing it will be seen that the particular mol ratio of halogenated nitrile to the other components is dependent somewhat upon the inherent characteristics and other properties desired in the heat-curable and heat-cured resinous condensation products. The aldehydic reactant may be used, for example, in an amount corresponding to from one to six or seven or more mols thereof for each mol of aminotriazole. Good results usually are obtained by using from 1½ to 3¼ mols of aldehyde, specifically formaldehyde, for each mol of aminotriazole. Taking 1-amino guanazole (an aminotriazole containing three unsubstituted amidogen groups) as illustrative of the aminotriazole, particularly good results are obtained with approximately three mols aldehyde, e. g., formaldehyde, or slightly in excess of three mols aldehyde, for each mol of 1-amino guanazole. If the aminotriazole contains only two unsubstituted amidogen groups (or one unsubstituted and two partly substituted amidogen groups), then one advantageously may use approximately two mols aldehyde, or slightly in excess of two mols aldehyde, for each mol of aminotriazole. If the aminotriazole contains only one unsubstituted amidogen group (or two partly substituted amidogen groups), then no particular advantage usually accrues from using much in excess of one mol aldehyde for each mol of such an aminotriazole. When the aldehyde is available for reaction in the form of an aldehyde-addition product such, for instance, as dimethylol urea, trimethylol melamine, etc., then higher amounts of such aldehyde-addition products ordinarily are used, for example from two or three to twelve or fifteen or more mols of such aldehyde-addition product for each mol of the aminotriazole.

When an aldehyde-addition product of an aminotriazole, e. g., a methylol guanazole as for instance dimethylol guanazole, is used as a reactant with a halogenated nitrile of the kind with which this invention is concerned, such aldehyde-addition product functions in a dual capacity in that it provides a source for the introduction of both an aminotriazole and an alkylene bridge, e. g., —$CH_2$—, into the resin molecule. The aldehyde-addition product may be used alone or together with an aminotriazole, or with an aldehyde or with both an aldehyde and an aminotriazole.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, isobutyl, hexyl, etc., alcohols; polyhydric alcohols such as ethylene glycol, diethylene glycol, glycerine, pentaerythritol, polyvinyl alcohol, etc.; amides such as formamide, acetamide, stearamide, acrylamide, benzamide, toluene sulfonamides, benzene sulfonamides, adipic diamide, phthalamide, etc.; amines, e. g., ethylene diamine, aniline, phenylene diamine, etc.; phenol and substituted phenols, e. g., the aminophenols, the cresols, the xylenols, the tertiary alkyl phenols and other phenols such as mentioned in my Patent No. 2,239,441; ketones; and others. Those modifying agents which are reactable with the aminotriazole, or with the aldehyde or with the reaction product of the aldehyde and the aminotriazole (that is, an aldehyde-addition product of the aminotriazole, e. g., dimethylol guanazole) may be incorporated into the composition by mixing all the reactants and effecting condensation therebetween or by various permutations of reactants as described, for example, in my Patent 2,239,441 with particular reference to reactions involving a phenol, an aliphatic aldehyde and a malonic compound (page 3, column 1, lines 2-24).

The modifying bodies also may take the form of high molecular weight bodies with or without resinous characteristics, for example hydrolyzed wood products and other modifying agents such as mentioned in my copending application Serial No. 428,586, filed January 28, 1942, with reference to the modification of condensation products of ingredients comprising an aminotriazole, an aldehyde and certain halogenated acylated ureas. Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide molding compositions best fitted to yield molded articles of optimum properties for the particular service application.

From the foregoing description it will be seen that the present invention provides new and useful compositions of matter comprising a condensation product (in heat-curable or heat-cured state) of ingredients comprising essentially (1) an aminotriazole (amidogentriazole), more particularly a guanazole, e. g., guanazole itself, 1-phenyl guanazole, 1-tolyl guanazole, 1-carbamyl guanazole, etc., (2) an aldehyde, e. g., formaldehyde, and (3) an alpha, a beta, a gamma, an alpha beta, an alpha gamma, a beta gamma or an alpha beta gamma halogenated aliphatic nitrile. The scope of the invention also includes method features for the production of such condensation products. For instance, one method feature of the invention comprises effecting partial reaction between ingredients comprising an aminotriazole and an aldehyde under alkaline conditions and in the presence or absence of other aldehyde-reactable compounds, e. g., a urea, an aminotriazine, for instance melamine, etc., adding to the resulting partial condensation product a small amount of a halogenated nitrile of the kind herein described, and causing the said halogenated nitrile to intercondense with the said partial condensation product. My invention also provides thermosetting (heat-hardenable) molding compositions comprising a filler, e. g., a cellulosic filler, and a heat-curable condensation product of this invention, e. g., a heat-hardenable resinous condensation product of ingredients comprising an aminotriazole, formaldehyde or its equivalent and a halogenated nitrile, more particularly an alpha chlorinated nitrile such as a chlorinated acetonitrile, as well as molded articles of manufacture comprising the heat-set molding compositions.

The modified and unmodified resinous compositions of this invention have a wide variety of uses. For example, in addition to their use in the production of molding compositions, they may be employed as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the condensation product of ingredients comprising an aminotriazole, an aldehyde and a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles, the said nitriles being members of the halogenated aliphatic series.

2. A composition as in claim 1 wherein the condensation product is an alcohol-modified condensation product of the stated components.

3. A composition as in claim 1 wherein the aminotriazole is a guanazole.

4. A heat-curable resinous condensation product of ingredients comprising an aminotriazole, formaldehyde and a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles, the said nitriles being members of the halogenated aliphatic series.

5. A product comprising the cured resinous condensation product of claim 4.

6. A composition comprising the product of reaction of (1) a partial condensation product obtained by reaction, under alkaline conditions, of ingredients comprising an aminotriazole and an aldehyde, and (2) a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles, the said nitriles being members of the halogenated aliphatic series.

7. A resinous composition comprising the product of reaction of (1) a partial condensation product obtained by reaction, while admixed with an alkaline substance, of ingredients comprising a guanazole and formaldehyde, and (2) a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles, the said nitriles being members of the halogenated aliphatic series.

8. A resinous composition comprising the product of reaction of (1) a partial condensation product obtained by reaction, while admixed with a condensation catalyst comprising ammonia and a fixed alkali, of ingredients comprising a guanazole and formaldehyde, and (2) a halogenated acetonitrile.

9. A resinous composition obtained by reaction of ingredients comprising 1-phenyl guanazole, formaldehyde and a chlorinated acetonitrile.

10. A resinous composition comprising the product of reaction of ingredients comprising urea, 1-phenyl guanazole, formaldehyde and monochloroacetonitrile.

11. A composition comprising the resinous product of reaction of ingredients comprising an aminotriazole, an aminotriazine, an aldehyde and a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles, the said nitriles being members of the halogenated aliphatic series.

12. A composition comprising the resinous product of reaction of ingredients comprising an aminotriazole, a urea, an aldehyde and a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles, the said nitriles being members of the halogenated aliphatic series.

13. A composition comprising the resinous product of reaction of ingredients comprising an aminotriazole, dimethylol urea and an alpha chlorinated aliphatic nitrile.

14. A resinous composition comprising the product of reaction of ingredients comprising a guanazole, dimethylol urea and a chlorinated acetonitrile.

15. A resinous condensation product of ingredients comprising urea, a guanazole, formaldehyde and an alpha chlorinated aliphatic nitrile.

16. A resinous condensation product of ingredients comprising melamine, a guanazole, formaldehyde and an alpha chlorinated aliphatic nitrile.

17. A thermosetting molding composition comprising a filler and a heat-hardenable resinous condensation product of ingredients comprising an aminotriazole, formaldehyde and an alpha chlorinated aliphatic nitrile.

18. An article of manufacture comprising the heat-set molding composition of claim 17.

19. The method of preparing new condensation products which comprises effecting reaction between ingredients comprising an aminotriazole, an aldehyde and a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles, the said nitriles being members of the halogenated aliphatic series.

20. The method which comprises effecting partial reaction under alkaline conditions between ingredients comprising an aminotriazole and an aldehyde, adding to the resulting partial condensation product a small amount of a halogenated nitrile selected from the class consisting of alpha halogenated nitriles, beta halogenated nitriles, gamma halogenated nitriles, alpha beta halogenated nitriles, alpha gamma halogenated nitriles, beta gamma halogenated nitriles and alpha beta gamma halogenated nitriles, the said nitriles being members of the halogenated aliphatic series, and causing the halogenated nitrile to intercondense with the said partial condensation product.

GAETANO F. D'ALELIO.

CERTIFICATE OF CORRECTION.

Patent No. 2,320,820. June 1, 1943.

GAETANO F. D'ALELIO.

It is hereby certified that error appears in the printed specification of the above numbered patent requiring correction as follows: Page 3, second column, line 72, for the word "not" read --now--; page 5, first column, line 45, for "where" read --were--; line 73, for "guanazoleacrolein" read --guanazole-acrolein--; and second column, line 62, before "0.5" insert an opening parenthesis; page 8, first column, line 13, for "aldehyde" read --aldehydes--; and that the said Letters Patent should be read with this correction therein that the same may conform to the record of the case in the Patent Office.

Signed and sealed this 20th day of July, A. D. 1943.

(Seal)

Henry Van Arsdale,
Acting Commissioner of Patents.